METHOD OF ETCHING A MAGNETIC ELEMENT FOR INCREASE IN COERCIVITY

Filed Feb. 13, 1967 2 Sheets-Sheet 1

INVENTORS.
WILLIAM W. POWELL,
THOMAS J. AMMONS,
BY Robert Thompson
ATTORNEY.

June 23, 1970 W. W. POWELL ET AL 3,516,881

METHOD OF ETCHING A MAGNETIC ELEMENT FOR INCREASE IN COERCIVITY

Filed Feb. 13, 1967 2 Sheets-Sheet 2

United States Patent Office 3,516,881
Patented June 23, 1970

3,516,881

METHOD OF ETCHING A MAGNETIC ELEMENT FOR INCREASE IN COERCIVITY

William W. Powell, Manhattan Beach, and Thomas J. Ammons, Canoga Park, Calif., assignors to Hughes Aircraft Company, Culver City, Calif., a corporation of Delaware Filed Feb. 13, 1967, Ser. No. 615,788
Int. Cl. C23f *1/00*; H01f *1/04*; C22c *39/36*
U.S. Cl. 156—17 10 Claims

ABSTRACT OF THE DISCLOSURE

A magnetic memory element including a thin film member of anisotropic magnetic material having a surface which is slightly etched in a mild etching solution and a method for etching the element.

This invention relates to improvements in thin film magnetic elements and more particularly to improvements in a thin film magnetic memory element having anisotropic magnetic characteristics, and methods for making the same.

In the field of digital computers, thin film elements which exhibit anisotropic magnetization properties have been incorporated in magnetic memory elements. In one type of operation, a first magnetic field was applied transverse to the axis of anisotropy to rotate the magnetization to a position about 90° to the axis of anisotropy. A second magnetic field was directed parallel to the axis of anisotropy in one of the two possible directions to bias the magnetization vector in the desired direction. Thereafter, the transverse magnetic field was removed, allowing the magnetization vector to rotate to the biased or desired direction parallel to the axis of anisotropy. When the parallel magnetic field was removed, the remanent magnetization remained pointed in the desired direction parallel to the axis of anisotropy. Assuming that one of the directions of vectorial orientation of the remanent magnetization is a binary ONE storage condition and the other direction is a binary ZERO storage condition, the storage condition was read by applying another magnetic field to the thin film magnetic element transverse to the axis of anisotropy for vectorially rotating the magnetization from an orientation parallel to the axis of anisotropy through an angle $\theta$ off of the axis of anisotropy. The angle of rotation affected the magnetic flux coupled to the sense line. The change in coupled flux induced a voltage signal on the sense line which was detected.

In writing the informatioin stored in these thin film magnetic elements, the strength of the parallel applied magnetic field had to be kept within a relatively low upper limit so that the stored information in other storage locations was not destroyed on writing while at the same time still providing adequate field strength for writing in the desired location. More specifically, domain wall motion tended to occur as the externally applied magnetic field exceeded the coercive force Hc of the magnetic material, whereupon the remanent magnetization was lost.

In addition, repeated application of a magnetic field sufficient to rotate the remanent magnetism through a significant angle $\theta$ on read could result in the formation of reversed magnetic domains at the ends of the thin film magnetic elements along the axis of anisotropy. Consequently, the stored information could eventually be destroyed when repeatedly read out except for very low levels of externally applied magnetic fields. As a result, the maximum angle of rotation of the remanent magnetization in these thin film magnetic elements was small, resulting in low level sense signals.

Accordingly, it is an object of this invention to provide improvements in thin film magnetic elements of the above type.

Still another object is to provide improvements in thin film magnetic devices which, when used in a memory or logic circuit, are featured by an increase in the coercive force required before switching occurs relative to the coercive force required for an unimproved device.

Another object is to provide an improved thin film magnetic element in which stored information can be nondestructively read out for repeated reading operations.

Still another object is to provide a thin film magnetic element in which the level of the output signal can be greatly increased.

Yet another object is to provide a method of making a thin film magnetic element of the type that can be included in a magnetic bistable device and in which the level of the output signal is greatly increased.

Still another object is to provide a thin film memory element and methods for making the same, in which the surface of the thin film element is slightly etched.

Other objectives can be attained by providing, on a substrate, a thin film magnetic element which requires a high coercive force Hc and has anisotropic magnetism characteristics. One such material includes about 80½% Ni, about 18½% Fe, and about 1% Cu. The thin film element is subjected to a cleaning bath to remove any surface impurities and is then subjected to a mild strength etching solution of ferric chloride $FeCl_3$ which slightly etches the surface of the element. The thin film magnetic element so produced is feature by an increase in the required coercive force Hc.

The improved thin film magnetic element can be included in a device such as a magnetic memory element. In this bistable device, any remanent magnetization subsequently written into the element represents the storage condition and is nondestructively read out by the previously described rotational switching technique to obtain a readily sensed and enhanced output signal.

Other objects, features, and advantages of this invention will become apparent upon reading the following detailed description and referring to the accompanying drawings, in which:

FIG. 1 is a schematic representation of rotational switching in a thin film magnetic element which exhibits uniaxial anisotropic properties:

FIGS. 2*a* and 2*b* are graphical illustrations of representative magnetic fields which, when applied to the thin film magnetic element, can affect a write or read operation thereof;

Before describing the improved thin film magnetic structure and methods for producing the improved structure, reference is made to the schematic diagrams of FIGS. 1 through FIGS. 2*a* and 2*b* which illustrate the principle of rotational switching in thin film magnetic elements which exhibit anisotropic magnetic properties.

Figure 1:
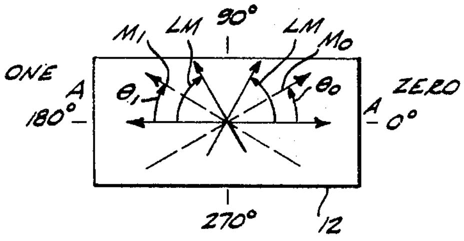

Referring now to the drawings, FIG. 1 is a schematic representation of a thin film magnetic element 12 which requires as high a coercive force as is practical and which exhibits anisotropic magnetic properties identified by an axis of anisotropy A—A. For example, a range of coercive forces that are desirable are between 2.5 and 5 oersteds. Of course, the coercive force might be higher or lower in related applications. A characteristic of the anisotropic properties is that any remanent magnetization M has a tendency or preference for an orientation parallel to the axis of anisotropy A—A and is vectorially pointed in any one of two possible directions there along.

The two possible vectorial directions of the remanent magnetization M can be arbitrarily selected to represent two possible digital storage conditions. For example, the remanent magnetization M, when vectorially pointed from left to right toward a ZERO reference point, can represent a digital ZERO storage condition. Conversely, the remanent magnetization M, when vectorially pointed from right to left toward a 180° reference point, can represent a digital ONE storage condition.

Figure 2A:
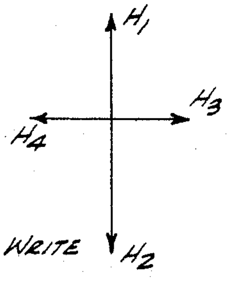

To write such digital information into the element 12, a pair of intersecting magnetic fields such as are graphically illustrated in FIG. 2*a* are applied to the thin film magnetic element 12 to vectorially rotate the magnetization vector M off of the axis of anisotropy A—A and to let it rotatively return to its preferred orientation parallel to the axis of anisotropy A—A vectorially pointed in a selected one of the two possible directions. For example, a magnetic field $H_1$ or $H_2$ can be applied transverse to the axis of anisotropy A—A for rotating the magnetization vector M toward a 90° reference point or toward a 270° reference point, respectively. In addition, a second magnetic field $H_3$ or $H_4$ can be applied parallel to the axis of anisotropy A—A so that the resultant magnetic field, developed when it is combined with a transverse magnetic field such as $H_1$, will vectorially rotate the magnetization vector M to an $\angle M$ where $$0^\circ < \angle M < 90^\circ \text{ or } 90^\circ < \angle M < 180^\circ$$

respectively. Thereafter, when the transverse magnetic field $H_1$ is removed, the magnetization vector M rotatively returns to an orientation parallel to the axis of anisotropy A—A and vectorially points from left to right toward the 0° reference point, if combined magnetic fields $H_1$ and $H_3$ were applied. Alternatively, the remanent magnetization M vectorially points from right to left toward the 180° reference point if combined magnetic fields $H_1$ and $H_4$ were applied. Thus, a digital ZERO or a digital ONE can be written and stored in the thin film magnetic element 12, depending upon the selection of the magnetic fields.

Figure 2B:
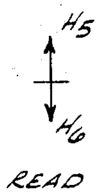

To interrogate or read the storage condition of the thin film magnetic element 12, a magnetic field $H_5$ or $H_6$ such as illustrated in FIG. 2*b* is applied transverse to the axis of anisotropy A—A for rotating the magnetization vector M off of the axis of anisotropy. Such rotation of the magnetization vector M induces a voltage signal on a sense conductor (not shown) which is magnetically coupled to the thin film element 12. For example, with a digital ZERO storage condition, the remanent magnetization M is vectorially oriented from left to right. Thus, if a magnetic field $H_5$ were applied to the thin film magnetic element 12, the magnetization vector M will rotate vectorially through an angle $\theta_0$ to an orientation represented by the dashed line magnetization vector M. Conversely, with a digital ONE storage condition, the remanent magnetization is vectorially pointed from right to left. Thus, if the transverse magnetic field $H_5$ were applied to the thin film magnetic element 12, the magnetization vector M will rotate through an angle $\theta_1$ to a position represented by the dashed line magnetization vector $M_1$.

As previously stated, the rotation of the magnetization vector M off of the axis of anisotropy A—A induces a voltage signal on a sense line which is magnetically coupled to the thin film magnetic element 12. In rotating the magnetization vector M off of the axis of anisotropy A—A with the transverse magnetic fields $H_5$ or $H_6$, care is taken that the strength of the externally applied field is kept sufficiently low so that reverse magnetic domains are not developed at the ends of the thin film magnetic element 12, identified by the reference points 0° and 180°, respectively. As a result, the angles $\theta_0$ and $\theta_1$ through which the magnetization vector M is rotated is small. Consequently, the change in the coupled magnetic flux detected by the sense line is low.

Figure 3:
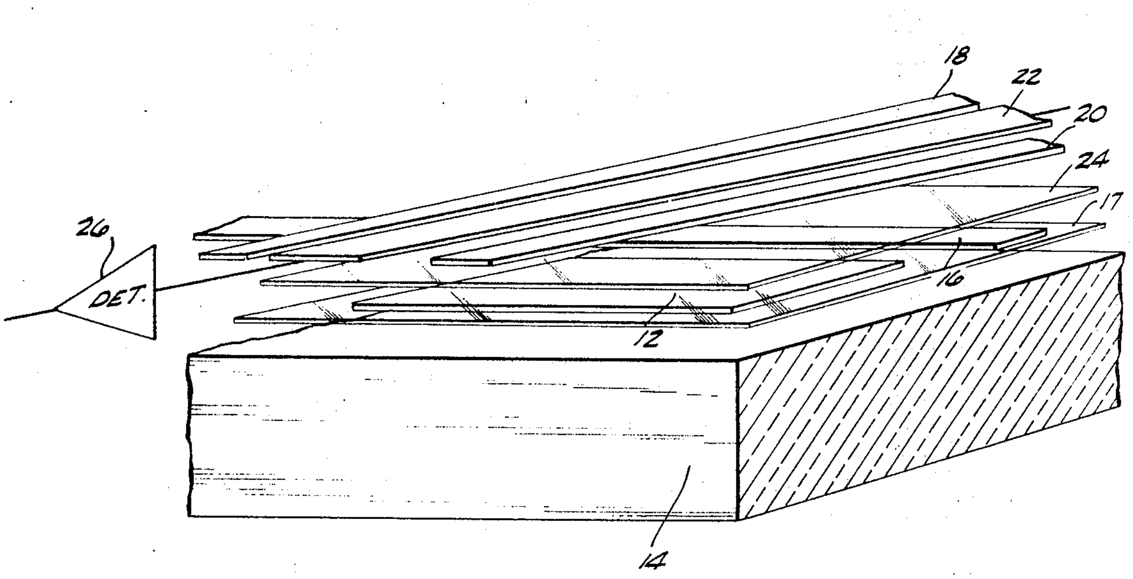
FIG. 3 is a perspective view (not to scale) of a magnetic memory element utilizing the improved features.

Structurally, a single memory cell can include the thin film magnetic element 12 deposited upon a substrate 14, as illustrated in FIG. 3.

The substrate 14 can be of glass such as Corning Micro Sheet No. 0211 which is an alkali, zinc, borosilicate, described in Corning Glass Works Bulletin CCP 2/5M/9–62. In one device that has been constructed, the glass is about 6 mils thick.

The thin film magnetic element 12, of a material that requires a high coercive force H*c*, is deposited upon the surface of the substrate 14 so that it exhibits uniaxial anisotropic magnetic characteristics. In devices that have been built, the thin film magnetic elements have required a coercive H*c* of from 1 oersted to 2.5 oersteds and require an anisotropy field of from 2 oersteds to 6 oersteds. Of course, these limits could be higher or lower. One way to deposit the thin film is to heat a mixture of nickel (Ni), iron (Fe), and copper (Cu) in a vacuum to form vapors. The substrate 14 is positioned so that the vapors are deposited upon the surface of the substrate and solidify into a thin film. During the deposition process, the substrate 14 is subjected to a strong magnetic field having flux lines which are directed substantially parallel across the plane of the substrate. As a result, the thin film of magnetic material will exhibit anisotropic magnetic properties. Of course, other techniques for building up the thin film element include sputtering, plating, and electrolysis.

Figure 4:
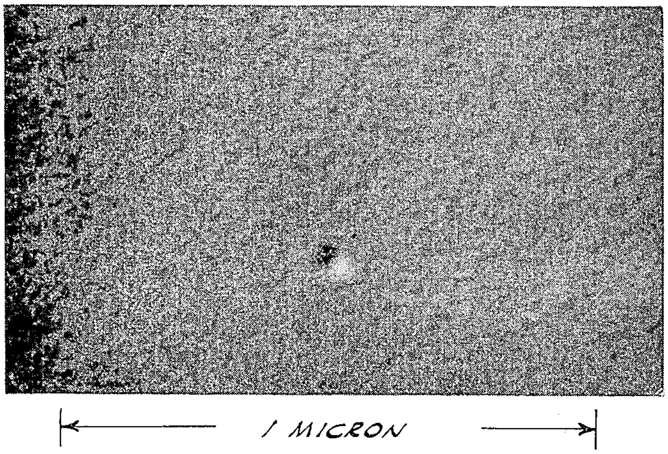
FIG. 4 is a photomicrograph of the surface of an unetched thin film magnetic element.

One thin film of magnetic material that provided especially good results included about 82½% nickel (Ni), about 16½% iron (Fe), and about 1% copper (Cu), all by weight, in a layer 1,000 angstroms thick, and is illustrated in the photomicrographs of FIG. 4 which is a magnification of 98,000×. This particular material has the advantage of not having its magnetic properties affected by mechanical stress. It is, of course, possible to eliminate the copper (Cu) and have a mixture of 83% nickel (Ni) and 17% iron (Fe). In addition, it is also possible to add other materials such as cobalt (Co.) Other mixture ratios could be used as long as the material exhibited adequate coercivity and anisotropy characteristics.

In order to divide the deposited thin film of magnetic material into separate thin film magnetic elements 12, the material is masked into element areas and subjected to an etching bath such as ferric chloride ($FeCl_3$) to remove the thin film material in the unmasked areas betwen adjacent magnetic elements 12. Another method involves the use of a mask during deposition so that only the desired element areas are exposed to the vapor stream. Each thin film magnetic element 12 can be substantially rectangular in shape and be 80 mils long by 30 mils wide. It should, of course, be understood that the elements 12 do not have to be rectangular in shape or that particular size.

Figure 5:
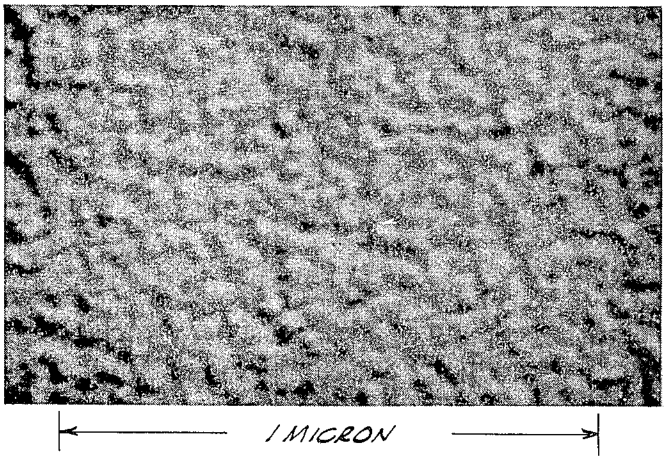
FIG. 5 is a photomicrograph of the surface of an improved slightly etched thin film magnetic element.

It has been discovered that the magnetic properties of the thin film magnetic element 12 can be improved by slightly etching the surface of the element to the extent illustrated in the photomicrograph of FIG. 5, which has a magnification of 98,000×. As a result of the etching, the coercive force H*c* required is increased to a range between 2.5 oersteds and 4 oersteds. As a result, the angle through which the magnetization vector M can be rotated without destroying the stored information is greatly increased, while also permitting an increase in the angles $\theta_0$ and $\theta_1$ through which the magnetization vector M can be repeatedly rotated on readout without developing reversed magnetic domains at the ends of the axis of anisotropy A—A and thereby destroying the stored information.

One method for producing the improved thin film magnetic element 12 is to clean the surface of the magnetic material 12 and to slightly etch the clean surface in an etching solution.

To clean the surface of the material, it is subjected to alternate baths of hydrochloric acid HCl and sodium hydroxide NaOH. More specifically, the thin film magnetic element 12 on the substrate 14 is immersed in a 3 molar solution of hydrochloric acid at about 72° F. for ten seconds. The element 12 and substrate 14 are removed and washed with water $H_2O$ and then immersed in a 3 molar solution of sodium hydroxide NaOH at about 72° F. After about ten seconds, the element 12 and substrate 14 are removed and washed with water ($H_2O$) and again immersed in the 3 molar solution of hydrochloric acid HCl for ten seconds and again washed with water ($H_2O$). Thereafter, it is again immersed in the 3 molar solution of sodium hydroxide (NaOH) for ten seconds and thereafter washed with $H_2O$. After this cleaning bath, the surface of the thin film magnetic element 12 should be uniformly clean.

The hydrochloric acid HCl and the sodium hydroxide NaOH can be agitated at ultrasonic frequencies such as 25 kc. to aid the cleaning process.

Thereafter, the cleaned surface of the thin film magnetic element is slightly etched in a mild etching solution. More specifically, the surface of the thin film magnetic element 12 is subjected to a weak 0.013 molar solution of ferric chloride ($FeCl_3$) at about 72° F. for a uniform amount of time. For example, six seconds of etching will provide especially good results in an improved thin film magnetic element 12 which exhibits the desired characteristics. This has been done by dipping the thin film magnetic element 12 and the substrate 14 into the etching solution, one edge first for three seconds, removing the substrate 14 and element 12 and washinging it in water, and thereafter immersing the substrate 14 and element 12, the opposite edge first for three seconds, and then removing it and washing it in water. It is, of course, possible to do the etching in a single step.

The strength of the etching solution can, of course, be greater than, or less than 0.013 molar; however, an etching solution of 0.025 molar of $FeCl_3$ was found to be a practical upper limit for the hand batch fabricated devices since the etching solution etched very quickly. Of course, for automatic batch fabricating, this may not be a practical upper limit. In addition, other etching materials can be used. For example, hydrocloric acid (HCl) can be used as the etching solution.

The slight etching of the surface of element 12 is not apparent to an unaided eye. However, under an electron microscope, at a magnification of 98,000× (FIG. 5), the surface was textured by the etching solution.

In addition, when measured with a conventional magneto optic tester, the coercive force $Hc$ of the thin film magnetic material 12 had increased.

An improved thin film magnetic bistable element, illustrated in the perspective drawing of FIG. 3, includes the slightly etched thin film magnetic element 12. In operation, a word line 16, located in a first strata above the surface of the magnetic element 12, is oriented parallel to the axis of anisotropy. The word line 12 generates the magnetic fields $H_1$ or $H_2$ (FIG. 2*a*) during a write operation, and generates the magnetic fields $H_5$ or $H_6$ during the read operation. Of course, instead of a single strip, the word line 16 can be a multi-turn planar structure of the serpentine structure described in U.S. patent application Ser. No. 493,456, filed on Oct. 6, 1965, of which William W. Powell is the inventor. The word line can be a layer of copper, 0.0013 inch thick, which is adapted to carry electrical current longitudinally therealong. In order to electrically insulate the word line 16 from the magnetic element 12, a lamina or sheet of electrically insulating material 17 can be inserted between them or the word line can be encapsulated within a sheet of plastic or layers of glass.

Two parallel spaced apart digit lines 18 and 20, located in another strata above the word line 16, are oriented transverse to the axis of anisotropy and generate the magnetic field $H_3$ or $H_4$ (FIG. 2*a*) during the write operation. The digit lines 18 and 20 can also be strips of copper which are adapted to carry electrical current in parallel circuit relationship during the write operation, generating the magnetic fields $H_3$ or $H_4$ which determine what orientation the remanent magnetization M will have along the axis of anisotropy when written in.

A sense line 22 is positioned in the same strata between the digit lines 18 and 20 in parallel spaced apart relationship and also extends transverse to the axis of anisotropy. The strata of the digit lines 18 and 20 and the sense line 22 can be electrically insulated from the word line 16 by a layer of insulating material 24 or by encapsulation. The sense line 22 may also be of copper and is magnetically coupled to the thin film magnetic element 12. As a result, during the read operation, the word line 16 produces the magnetic field $H_5$ or $H_6$ causing the magnetization vector M to rotate through an angle $\theta_0$ or $\theta_1$. The resulting change in the flux coupling with the sense line 22 induces a voltage signal on the sense line, which signal is detected by a sense amplifier 26, connected to one end of the sense line.

Since the angle of rotation $\theta_0$ or $\theta_1$, through which the remanent magnetization can be rotated before reverse domains begin to extend from the edge of the thin film magnetic element, is significantly increased by the slight etching on the surface of the thin film magnetic element 12, the level of the induced voltage signal resulting from the rotation of the magnetization vector M is also significantly increased, causing a corresponding increase in the signal detected by the sense amplifier 26. As a result, a greatly enhanced output signal is produced relative to the output signal for a thin film magnetic element 12 which is not slightly etched. In addition, repeated rotation of the magnetization vector M through the angles $\theta_0$ or $\theta_1$ does not set up magnetic poles at the ends of the axis of anisotropy A—A. Consequently, improved nondestructive readout is attained.

The etching has additional advantages which are apparent where the improved memory element is thought of as being incorporated in a memory matrix including other memory cells of the same type. For example, during writing, unselected memory locations (not shown) are subjected to fields parallel to the anisotropy axis because the digit lines 18 and 20 pass over other unselected bits in the memory. The increase in coercive force resulting from etching permits higher digit currents to be used without disturbing the unselected bit locations.

In addition, NDRO operation can be accomplished by rotating the magnetization vector through a relatively small angle $\theta_0$ or $\theta_1$ rather than 90° as in DRO operation. The etching permits a greater rotation angle $\theta_1$ or $\theta_2$ to be used before the stored information begins to deteriorate; and, as previously stated, since the magnitude of the read signal increases with the angle $\theta_1$ or $\theta_2$, a greater read signal level is obtained. In DRO operation, however, the read signal level is already at a maximum since the angle $\theta$ is 90°. Consequently, a significant benefit in DRO operation is greater digit current margins during writing.

While the salient features have been illustrated and described with respect to a particular embodiment, it should be readily apparent that modifications can be made within the spirit and scope of the invention, and it is therefore not desired to limit the invention to the exact details shown and described.

What is claimed is:

1. A method for producing on a substrate an improved thin film magnetic element comprised mainly of nickel and iron having anisotropic magnetic characteristics and which requires high coercive forces an improvement therein comprising the steps of:

cleaning the surface of the thin film magnetic element; and etching the clean surface of the thin film element slightly about a .013 molar solution of ferric chloride ($FeCl_3$) at about 72° F. for a sufficient time to obtain an increase in the coercive forces thereof to at least about 2.5 oersteds.

2. The method of claim 1 in which the thin film includes a small amount of copper.

3. The method of claim 1 in which the thin film is about 1,000 angstroms thick.

4. The method of claim 1 in which the thin film includes about 83% nickel and about 17% iron.

5. The method of claim 1 in which the thin film includes about 82½% nickel, about 16½% iron and about 1% copper.

6. A bistable magnetic film device made in accordance with the method of claim 1.

7. A bistable magnetic film device made in accordance with the method of claim 2.

8. A bistable magnetic film device made in accordance with the method of claim 3.

9. A bistable magnetic film device made in accordance with the method of claim 4.

10. A bistable magnetic film device made in accordance with the method of claim 5.

References Cited

UNITED STATES PATENTS 2,900,282 8/1959 Rubens ------------ 117—227

OTHER REFERENCES

Proceedings of the IRE January 1961, pp. 155–164, Magnetic Film Memory Design by Raffel et al., (pp. 157, 158, 162).

Journal of Applied Physics, vol. 37 No. 3, Mar. 1, 1966, pp. 1380 and 1381, Effects of Copper Coatings on Drive Current of Permalloy Film DRO Storage Elements by Shimek et al.

JACOB H. STEINBERG, Primary Examiner

U.S. Cl. X.R.

148—31.55; 117—237, 238